(12) United States Patent
Grosskreuz et al.

(10) Patent No.: US 10,029,855 B2
(45) Date of Patent: Jul. 24, 2018

(54) MULTI-RAIL/ROLLER COMPLIANCE SYSTEM FOR INDEPENDENT MOVER PRODUCTS

(71) Applicant: Rockwell Automation Technologies, Inc., Mayfield, OH (US)

(72) Inventors: Paul J. Grosskreuz, West Bend, WI (US); Ilya Gurevich, Milwaukee, WI (US); John C. Lamouree, East Patchogue, NY (US); Juan A. Fernandez, Brown Deer, WI (US); Jeffrey W. Dujmovic, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 15/292,396

(22) Filed: Oct. 13, 2016

(65) Prior Publication Data
US 2018/0086565 A1    Mar. 29, 2018

Related U.S. Application Data

(60) Provisional application No. 62/399,003, filed on Sep. 23, 2016.

(51) Int. Cl.
*B65G 47/00* (2006.01)
*B65G 23/23* (2006.01)
*B65G 54/02* (2006.01)

(52) U.S. Cl.
CPC ............. *B65G 23/23* (2013.01); *B65G 54/02* (2013.01)

(58) Field of Classification Search
None
See application file for complete search history.

(56) References Cited

U.S. PATENT DOCUMENTS

| | | | | |
|---|---|---|---|---|
| 2,932,258 A | * | 4/1960 | Marquard | ............... B61B 13/04 104/120 |
| 3,550,535 A | * | 12/1970 | Rooklyn | ............... B65G 17/20 104/118 |
| 3,785,475 A | * | 1/1974 | Maynard | ............... B23Q 7/03 198/345.3 |

(Continued)

FOREIGN PATENT DOCUMENTS

| DE | 3744627 C1 | 6/1989 |
|---|---|---|
| DE | 102013216958 A1 | 2/2015 |

(Continued)

OTHER PUBLICATIONS

Extended European Search Report dated Feb. 8, 2018; European Patent Application No. 17185661.0—(35) pages.

*Primary Examiner* — William Ray Harp
(74) *Attorney, Agent, or Firm* — Boyle Fredrickson, SC (57) ABSTRACT

A mover system that provides spatially separated rails of the track interacting with pairs of closely spaced opposed wheels of the mover constraining movement of the mover on the track is provided. Each pair of wheels includes standard cylindrical or crowned wheels contacting the opposed parallel sides of standard rectangular rails, retaining the movers on the track in both horizontal and vertical directions normal to a transport direction along the track. The wheels bear loads in a radial direction with respect to axial motion consistent with its naturally positioned strength.

20 Claims, 4 Drawing Sheets

(56) References Cited

U.S. PATENT DOCUMENTS

| | | | | |
|---|---|---|---|---|
| 3,902,432 | A * | 9/1975 | Shortridge | B61B 9/00 104/93 |
| 4,056,064 | A * | 11/1977 | Bottomley | B23Q 1/40 104/121 |
| 4,520,732 | A * | 6/1985 | Schwarzkopf | A63G 7/00 104/245 |
| 4,860,662 | A * | 8/1989 | Matsumoto | B61B 13/12 104/107 |
| 5,072,493 | A * | 12/1991 | Hommes | B29C 55/165 26/72 |
| 5,924,180 | A * | 7/1999 | Lindner | D06C 3/025 26/72 |
| RE39,747 | E | 7/2007 | Peltier et al. | |
| 8,397,896 | B2 | 3/2013 | Kleinikkink et al. | |
| 8,789,678 | B2 | 7/2014 | Kleinikkink et al. | |
| 8,794,426 | B2 | 8/2014 | Cooke | |
| 9,333,875 | B2 | 5/2016 | Staunton et al. | |
| 9,511,681 | B2 * | 12/2016 | Wernersbach | B60L 13/006 |
| 2003/0230941 | A1 * | 12/2003 | Jacobs | B60L 15/38 310/12.19 |
| 2012/0145500 | A1 | 6/2012 | Staunton et al. | |
| 2013/0084157 | A1 | 4/2013 | Staunton et al. | |
| 2014/0331888 | A1 * | 11/2014 | Wernersbach | B60L 13/006 104/282 |
| 2015/0008768 | A1 | 1/2015 | Achterberg et al. | |
| 2015/0027860 | A1 | 1/2015 | Kleinikkink et al. | |
| 2015/0028098 | A1 | 1/2015 | Kleinikkink et al. | |
| 2015/0048617 | A1 | 2/2015 | Prussmeier | |
| 2015/0048693 | A1 | 2/2015 | Prussmeier | |
| 2015/0137625 | A1 | 5/2015 | Achterberg et al. | |
| 2015/0344233 | A1 | 12/2015 | Kleinikkink et al. | |
| 2015/0349618 | A1 | 12/2015 | Kleinikkink et al. | |
| 2016/0031648 | A1 | 2/2016 | Prussmeier et al. | |
| 2016/0052526 | A1 * | 2/2016 | Slurink | B61B 13/04 104/93 |

FOREIGN PATENT DOCUMENTS

| | | |
|---|---|---|
| JP | 57174415 A | 10/1982 |
| JP | 62225106 A | 10/1987 |
| JP | 11099940 A | 4/1999 |
| WO | 2016/129797 A1 | 8/2016 |

* cited by examiner

MULTI-RAIL/ROLLER COMPLIANCE SYSTEM FOR INDEPENDENT MOVER PRODUCTS

CROSS REFERENCE TO RELATED APPLICATIONS

This application claims priority to U.S. Provisional Patent Application No. 62/399,003, filed on Sep. 23, 2016, which is herein incorporated by reference.

STATEMENT REGARDING FEDERALLY SPONSORED RESEARCH OR DEVELOPMENT

Background of the Invention

The present invention relates to motion control systems and, more specifically, to mover systems using linear motor principles to provide moving elements mounted to tracks via multiple rails and wheels.

Mover systems utilizing linear drives can be used in a wide variety of processes (e.g. packaging, assembly automation, processes involving use of machine tools, etc.) and provide an advantage over conventional conveyor belt systems to provide flexible, extremely high speed movement, and mechanical simplicity. The mover systems provide a set of independently moveable "movers" supported on a track that holds individually controllable electric coils. Successive activation of the coils by drive electronics and a control system create a magnetic field that move and relocate the movers along the track. Sensors may be spaced at fixed positions along the track and/or on the movers to provide information about the position and speed of the movers.

High speed motion is available because the movers form part of a linear motor driven directly by the coils without the need for intervening mechanical elements. Sensors allow this movement to be extremely accurate providing submillimeter positioning. Mechanical simplicity is available because the linear motor design eliminates drives, gears, cams, and belts, used with traditional conveyor belt systems. In addition to high-speed and mechanical simplicity, the mover system provides another advantage over conventional conveyor belt systems in that the movers may be independently moved and positioned in contrast to the items on a conventional conveyor belt system, which remain in a single locked relationship. With the elimination of belts, gears, and cams used in traditional conveyor belt systems, changing the motion of the movers is accomplished through electronic/digital programming and is much faster and easier than changing physical components.

Mover systems typically comprise interconnected track sections of straight and curved tracks, for example, to provide for an oval shaped track. The movers may be supported over the track on lateral rails that engage wheels on the movers. The wheels include precision ball bearings to maintain a precise positional relationship between the movers and the track in close proximity for strong magnetic coupling while allowing relatively free movement of the moving elements along the track modules against the loads and forces of mechanical loads on the mover during motion. These forces will vary during motion to include downward forces caused by the weight of the loads on the movers, inward forces caused by centripetal force, and torsion caused by the offset of the track from the center of mass of the load. Accurate location of the movers with motion is obtained through the use of wheels with V-shaped circumferential grooves that engage with a corresponding track side to provide resistance against axial motion.

The high speed and large forces experienced by the movers together with the required close tolerances can create substantial wear and degradation on the mover wheel bearings and track.

SUMMARY OF THE INVENTION

The present inventors have determined that a significant factor in bearing and track degradation for moving systems is system dimensional variation of the track holding the rails such that it greatly increases the force on the bearings. This variation occurs during manufacture, assembly, and use, for example, caused by heating of the coils held in the track, which support the rails. Accordingly, the present invention provides a rail system in which opposed wheels are closely spaced so that the transition gap between the wheels and the track is minimized as the mover passes between the straight and curved track. In addition, the present invention eliminates the V-wheels and the resultant sliding wear caused by high tolerance V-wheels which contact the sides of the track on which they engage. Eliminating the V-wheels also eliminates all but the frictional component of the axial forces on the bearings.

Specifically, in one embodiment, the invention provides a mover for use on a track providing a closed loop extending along a track circumferential path and having at least two rails extending along the circumferential path and displaced from each other in a direction perpendicular to the track circumferential path. The mover includes a frame supporting a magnetic element for interacting with corresponding magnetic elements on the track and supporting a first and second set of bearings. Each set provides two wheels each having peripheral contact surfaces rotatable about axes and in opposition across a gap distance bisected by a center point between the contact surfaces. The center points of the first and second bearing sets are displaced by a distance larger than the gap.

It is thus a feature of at least one embodiment of the invention to reduce the separation distance between opposed wheels to decrease the geometrical effect of passing through the straight to curved track transition that results in increased wheel clearance between the wheel and the rail and affects the loading of the bearings.

Each of the wheels is rotatable about a respective axis and the axes for the two wheels are parallel and the contact surfaces are displaced across the gap.

It is thus a feature of at least one embodiment of the invention to permit the use of tracks providing easily manufactured opposed parallel surfaces The axes of the first bearing set may be substantially perpendicular to the axes of the second bearing set.

It is thus a feature of at least one embodiment of the invention to provide resistance against forces directed in any of three directions constraining the mover except for in the direction of motion with a minimal set of bearings.

At least one of the wheels includes a compliant member adapted for variation of the gap distance. The compliant member may be a spring.

It is thus a feature of at least one embodiment of the invention to provide the benefits of reduced effects of thermal expansion together while accommodating track variations caused by changes in curvature of the track between straight and curved sections.

The wheels may be provided an outer cylindrical periphery having a hardened steel surface. The wheels may alternatively be provided with a barrel-shaped outer periphery.

It is thus a feature of at least one embodiment of the invention to reduce surface wear by hardening a rolling contact surface of a standard ball bearing. It is also a feature to allow the wheels to pivot while reducing the contact length.

Each set of bearings provides four wheels each having peripheral contact surfaces rotatable about axes and the axes for the four wheels are parallel and the contact surfaces for two wheels are opposed across a gap distance bisected by a center point between the contact surfaces of the other two wheels.

It is thus a feature of at least one embodiment of the invention to provide resistance to torsional loading parallel to the axes of the wheels.

The frame supports a third set of bearings wherein the third set provides two wheels each having peripheral contact surfaces opposed across a gap distance bisected by a center point between the contact surfaces; wherein the axes of the second bearing set is substantially perpendicular to the axes of the third bearing set and wherein the center points are displaced by a distance larger than the gap.

It is thus a feature of at least one embodiment of the invention to provide resistance to torsional loading about the track direction The center points are displaced by a distance substantially less than a height of the frame.

It is thus a feature of at least one embodiment of the invention to reduce the separation between bearing sets to reduce the effect of dimensional variation on the mover frame when there are multiple bearing sets with the same alignment displaced along the frame.

The present invention also provides a track used with a mover traveling along the track along a track circumferential path and having at least a first and second set of bearings having peripheral contact surfaces rotatable about axes and the axes for the two wheels of each first and second set of bearings are parallel and the axes of the first bearing set is substantially perpendicular to the axes of the second bearing set. The track includes a mover support frame having an electro-magnetic element for interacting with corresponding magnetic elements on the mover and supporting a first and a second rail extending along the circumferential path and displaced from each other in a direction perpendicular to the track circumferential path. Each track provides two opposed parallel contact surfaces and the first and second rail are displaced from each other a distance less than a length of the mover support frame.

It is thus a feature of at least one embodiment of the invention to provide a track compatible with a mover designed to minimize thermal expansion affects and a thin track geometry which reduces the necessary compliance caused by changing separation between the corresponding wheels on the inside and outside of the track. It is also a feature of at least one embodiment of the invention to provide a single track on a respective side of the mover with single directional loading on the track. The loading on the track is in the same direction as the thermal expansion and contraction of the linear motor. This track is less than a full length of the mover, on one end only, thus allowing a very short path for thermal expansion across the track.

The first and second rails are independently separable from the mover support frame and have a cross section with two parallel surfaces.

It is thus a feature of at least one embodiment of the invention to provide tracks that can be readily fabricated using standard materials and machining techniques at low cost.

The mover support frame further supports a third rail extending along the circumferential path and displaced from the first rail and second rail in a direction perpendicular to the track circumferential path.

It is thus a feature of at least one embodiment of the invention to use a three-track system to provide necessary support of the mover along the entire mover length. It is also a feature of at least one embodiment of the invention to control three independent directions of movement perpendicular to the motion of travel. The invention also allows for simple single directional loading on each bearing set.

The mover support frame provides a first lateral face, a second lateral face parallel to the first lateral face, and a third transverse face extending between the first and second lateral face, and defining a track attachment surface where the first rail is mounted to the first lateral face, the second rail is mounted to the third transverse face, and the third rail is mounted to the second lateral face.

It is thus a feature of at least one embodiment of the invention to provide spatial distance between the tracks for better control of the mover on the track.

A width of the rail is at least 10 times less than the length of the mover support frame.

It is thus a feature of at least one embodiment of the invention to provide thin tracks that are less affected by thermal expansion.

The opposed parallel contact surfaces of the first, second, and third rails are perpendicular to the first lateral face, second lateral face, and third transverse face respectively.

It is thus a feature of at least one embodiment of the invention to provide rectangular rails that are readily available and do not need to be fabricated using an extrusion process or another specialized method. However, the rails may take other forms or shapes consistent with the invention.

The rails may be hardened steel.

It is thus a feature of at least one embodiment of the invention to use a standard steel rail that may conform to the natural curvatures of the track attachment surface which may be curved.

The four wheels may form an isosceles trapezoid within inner wheels forming a shorter base of the trapezoid and outer wheels forming a longer base of the trapezoid parallel to the shorter base. The inner wheels may be formed outside of a triangle formed by joining a center of curvature of the track and the axes of the two outer wheels along their radii of curvature and a segment joining the axes of the two outer wheels.

It is thus a feature of at least one embodiment of the invention to align the wheels to minimize the transition gap while maintaining a tangential positioning of the wheels on the rail. It is also a feature of at least one embodiment of the invention to provide curved portions of the track that do not have a constant radius.

The present invention also provides a method of transporting a mover on a track along a transport direction and providing a track support frame providing a first face, a second face, and a third face defining a track attachment surface holding a plurality of individually controlled electromagnetic coils effective for creating electromagnetic fields, the track attachment surface carrying a first rail and second rail each having opposed parallel surfaces extending along the transport direction, the mover providing a first lateral arm communicating with the first wall, a second lateral arm communicating with the second wall, and a mounting platform extending between the first lateral arm and second lateral arm and holding magnetic elements positioned to interact with the electromagnetic fields of the track support frame, the mover carrying a first and second set of wheels contacting the opposed parallel surfaces of the first and second rails, respectively, in a direction perpendicular to the transport direction and in a direction perpendicular to an axis of rotation of the wheels, and the first and second rails separated on different faces of the track support frame. The method includes the steps of: mounting the mover to the track assembly; moving the mover along the track assembly along the transport direction; and restraining movement of the mover in a normal direction perpendicular to a direction of motion of the mover along the track assembly and a vertical direction perpendicular to the transport direction and perpendicular to the normal direction.

These particular objects and advantages may apply to only some embodiments falling within the claims and thus do not define the scope of the invention.

DETAILED DESCRIPTION OF THE PREFERRED EMBODIMENT

Figure 1A:
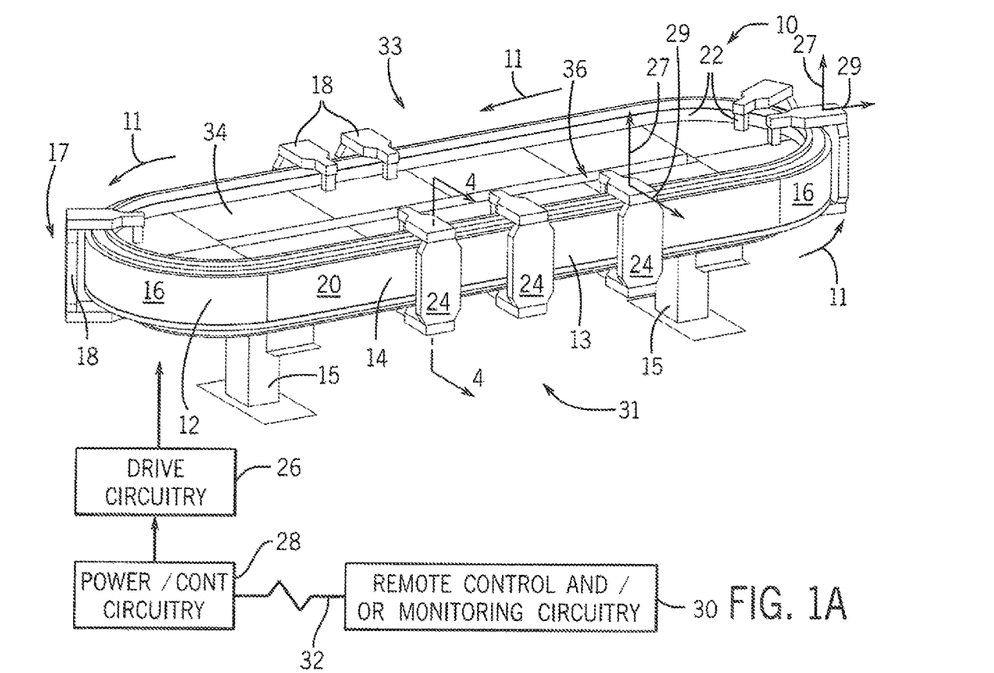
FIG. 1A is a perspective view of a transport system of the present invention illustrating straight and curved track modules and several movers positioned for movement along the modules.

Turning now to the drawings, and referring first to FIG. 1A, a transport system 10 for moving articles or products may include a track 12 providing a generally closed loop supporting a set of movers 24 movable along the track in a transport direction 11 or circumferential path. In one embodiment, the loop of the track 12 may be positioned to lie in a horizontal plane as depicted and may be supported above the ground by a pair of vertically extending legs 15 extending downward from the track 12 toward the ground from diametrically opposed sides 17 and 19 of the track 12.

In the illustrated embodiment, the track 12 may have a stadium shape, being a rectangle capped by semicircles, and may comprise of straight track modules 14 and curved track modules 16. The straight track modules 14 provide linear open ended segments while the curved track modules 16 provide semicircle arched segments which connect at their ends to the straight sections to form closed loop tracks 12. As illustrated, one or more straight track modules 14 extend along a front side 31 of the track 12 and one or more straight track modules 14 extend along a backside 33 of the track 12. The two curved track modules 16 extend along the left 17 and right 19 ends of the track 12, respectively, connecting with the front and back straight track modules 14 to form an elongated oval shaped platform. It is understood that the modules 14, 16 are generally self-contained and mountable in various physical configurations.

Figure 2:
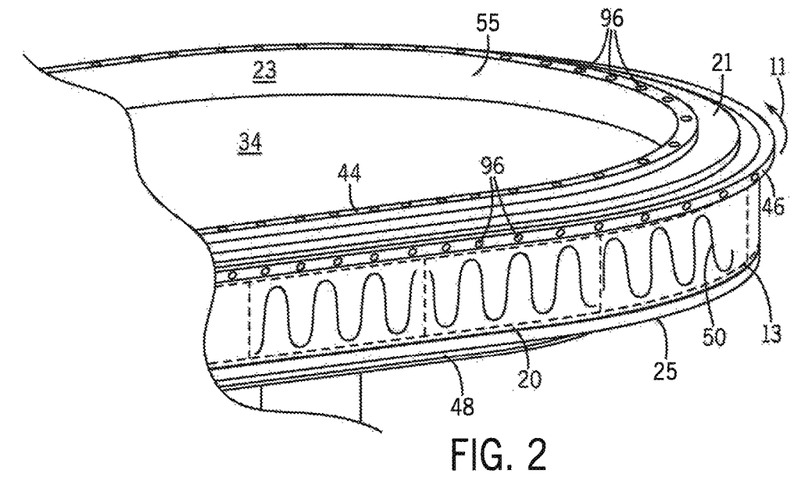
FIG. 2 is a partial isometric view of the track modules of FIGS. 1A and 1B showing rails extending laterally around the modules.

Referring also to FIG. 2, the modules 14, 16 form a vertically extending wall 13 forming an oval loop extending around an outer periphery of the track 12. The vertically extending wall 13 is defined by an inner surface 23 of the wall 13 opposite an outer surface 20 of the wall 13 connected at their upper ends by a top edge 21 and at their lower ends by a lower edge 25. An interior of the track 12 is defined by a horizontally extending surface 34 forming an interior floor or platform within the track 12. The horizontally extending surface 34 may extend inwardly from an approximate vertical center of the vertically extending wall 13 to form a ring along an inner perimeter of the track 12 while leaving a central opening 36 in the center of the track 12 free from vertical obstruction.

A series of parallel coils 50 are installed on the outer surface 20 of the vertically extending wall 13, or between the outer surface 20 and inner surface 23 of the vertically extending wall 13, and extending laterally about the outer periphery of the track 12. Drive circuitry 26 may be included in each module 14, 16 to allow for controlled power signals to be applied to the coils 50 in order to drive and position a plurality of movers 18 appropriately around the track 12. In the illustrated embodiment, the track modules 14, 16 are mounted end-to-end and interconnected with one another and/or with the power and control circuitry 28 to receive signals used to power the coils 50.

The drive circuitry 26 provides signals to each track module 14, 16, and specifically individual coils 50 of the track modules 14, 16 to create electromotive forces that interact with magnets 40 on the movers 18 to drive the movers 18 to specific locations, and at specific velocity and accelerations. This drive circuitry 26 may typically include inverter circuitry that makes use of power electronic switches to provide drive power to the individual coils 50 of each module in a controlled manner. In some embodiments, the drive circuitry 26 may be included in each individual module 14, 16, and signals provided to the drive circuitry 26 by power and control circuitry 28. Various remote control and/or monitoring circuitry 30 may be provided and this circuitry may be linked to the system by one or more networks 32. Such remote circuitry may generally allow for coordination of the operation of the transport system with other automation components, machine systems, and manufacturing and material handling machines.

Sensor arrays 55 may also be installed on the inner surface 23 of the vertically extending wall 13, or between the outer surface 20 and inner surface 23 of the vertically extending wall 13, and provided in each track module 14, 16 to interact with sensor components of the movers 18. The sensor arrays 55 will typically provide feedback that can indicate the position of the movers 18, and can be used to derive velocity, acceleration, jerk and other motion parameters. The power and control circuitry 28 (and the drive circuitry 26) may receive feedback from the movers 18 and/or from the sensor arrays 55 to detect the location, velocity, acceleration, and so forth of each mover 18. The sensor arrays 55 may comprise permanent magnets, energized coils, Hall effect sensors, or any other suitable devices with one component of the sensor system 22 mounted on the movers 18, while another component of the sensor system 22 is mounted at fixed locations around the track 12.

The track modules 14, 16 include a number of independently attached rails, as indicated by reference numerals 44, 46, 48, respectively, mounted to the track modules 14, 16 to allow for attachment of the movers 18 to the track 12. The rails 44, 46, and 48 of the present invention are bars extending about the track 12 along and parallel to the transport direction 11 and providing a rectangular cross section. The rails 44, 46, and 48 generally conform to the curvature of the track 12 thus extending straight along the straight track modules 14 and curved along the curved track modules 16. The rails 44, 46, and 48 may be constructed of hardened steel bent to conform to the outer curvature of the track 12.

A first rail 44 may extend upwardly along a vertical axis 27 from the top edge 21 of the vertically extending wall 13 and running longitudinally along the top edge 21 of the wall 13 along the transport direction 11. A second rail 46 extends transversely outward along an outwardly radial direction 29 from the outer surface 20 of the vertically extending wall 13 and runs longitudinally along the outer surface 20 of the wall 13 along the transport direction 11. A third rail 48 extends downwardly along the vertical axis 27 from the lower edge 25 of the vertically extending wall 13 and runs longitudinally along the lower edge 25 of the wall 13 along the transport direction 11. The rails 44, 46, 48 run generally parallel to one another, and parallel to the transport direction 11 to define a three rail system of mover 18 transport.

The rails 44, 46, 48 are generally thin and narrow encompassing only a partial width of the attachment edge of 21, 25 or surface 20 on which it is attached. The rails 44, 46, 48 generally have a width in a first direction extending parallel to the attachment surface of the track modules 14, 16 of approximately 0.5-1.5 inches and preferably approximately 1 inch. The rails 44, 46, 48 have a height in a second direction extending perpendicular to the attachment surface of the track modules 14, 16 of approximately 0.25-0.75 inches and preferably approximately 0.5 inches. The rails 44, 46, 48 include a plurality of laterally spaced bores 96 extending through the rails 44, 46, 48 between the attachment surface and outwardly extending surface facilitating attachment of the rails 44, 46, 48 to the track modules 14, 16, for example using screws or bolts extending through the bores 96.

Figure 3:
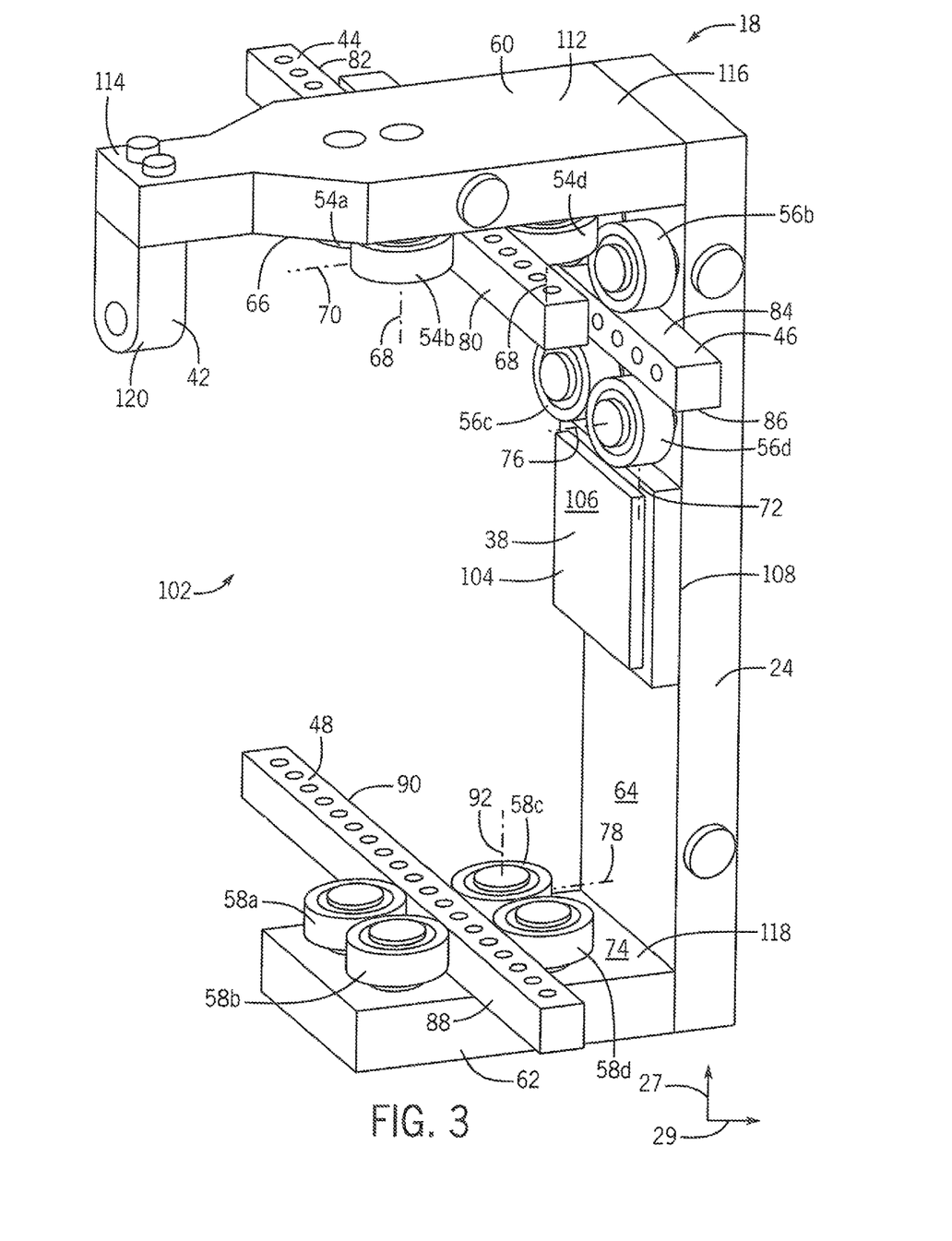
FIG. 3 is a right side isometric view of a mover of FIG. 1 shown attached to the rails of the track modules with the modules removed.

Referring now to FIGS. 1 and 3, the system further comprises one or more movers 18 which are mounted to and movable along the track 12. Each mover 18 comprises lateral mounting arms 60, 62 extending along a top and bottom of the track 12 and engaging the track 12 to remain securely attached thereon. An upper mounting arm 60 having a generally rectangular section 112 tapering toward a rounded distal end 114 extends horizontally and substantially parallel to a generally rectangular lower mounting arm 62 connected at their rear ends 116, 118, respectively, by a rectangular vertical mounting platform 24 extending therebetween. The mounting platform 24 extends opposite an open front end 102 provided between distal ends of the upper mounting arm 60 and lower mounting arm 62, respectively, and receiving an outer receiving edge of the track 12. When mounted to the track 12, the upper mounting arm 60 and lower mounting arm 62 extend in a radial direction 29 parallel to the top edge 21 and lower edge 25, respectively, and the mounting platform 24 extends along the vertical axis 27 parallel to the outer surface 20, so as to resemble a C-shaped frame extending around the three attachment edges or surfaces of the vertically extending wall 13.

The mounting platform 24 is generally longer (the distance between the outermost ends of the mounting arms 60, 62 defining a length of the mounting platform 24) than the mounting arms 60, 62. The mounting platform 24 may be approximately 10-20 inches long and the mounting arms 60, 62 may be approximately 5-10 inches long. In an actual implementation, various tools, holders, support structures, loads, and so forth may be mounted to the mounting platform 24 to be moved around the track 12. The upper mounting arm 60 may be longer than the lower mounting arm 62 so that a distal end 114 of the upper mounting arm 60 may extend past the top edge 21 to interact with the inner surface 23 of the track 12 as described below.

The movers 18 interact with the coil 50 and sensor arrays 55 in or between an inner surface 23 and outer surface 20 of the track modules 14, 16 as described below. A magnetic array 38 having a number of magnets therein and housed within a rectangular block 104 having a vertically extending front surface 106 opposite a vertically extending mounting surface 108 is mounted to an inner surface 64 of the mounting platform 24 by attaching the mounting surface 108 to the inner surface 64. The rectangular block 104 is generally mounted toward a center of the mounting platform 24 and corresponds in width with the mounting platform 24. The rectangular block 104 extends forwardly from the mounting platform 24 toward the open front end 102 such that the front surface 106 is parallel to the outer surface 20 of the track 12 when received thereon and a small air gap is provided between the magnetic array 38 and coils 50 of the track modules 14, 16 described above. The magnetic array 38 will typically be permanent magnets, such as ferrite core.

The mover 18 further comprises a sensor component 42, such as a permanent magnet, extending downwardly from the distal end 114 of the upper mounting arm 60. The sensor component 42 may be a generally rectangular projection with a rounded distal tip 120 extending downwardly and contacting the horizontally extending surface 34 and interacting with the sensor array 55 provided in the inner surface 23 of each track module 14, 16 described above. It should be noted, however, that the particular sensor component included in the mover 18 will depend upon the nature of the sensing strategy, the sensing resolution, and the position of the sensor on the mover (and cooperating components on the track module).

Again, the position, velocity, acceleration, and higher order derivative parameters are controllable for these movers 18 by appropriate control of the coils 50 of the system that are energized and de-energized as discussed above. In certain embodiments the movers 18 may be configured to be recognized by the power and control circuitry 28 as individual axes that are independently controlled, but with regulation of their position, velocity and acceleration to avoid conflicts, and collisions.

Figure 4:
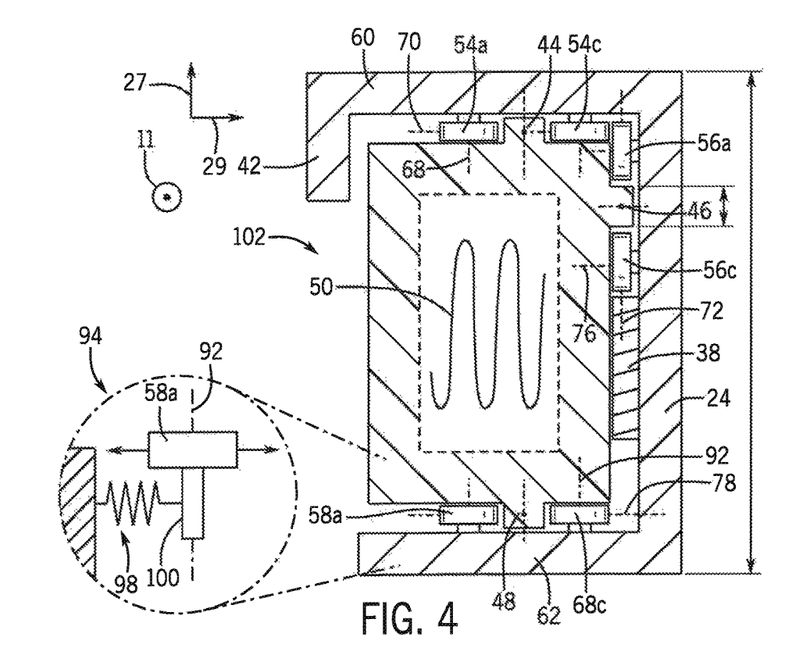
FIG. 4 is a cross sectional representation of a mover of FIG. 1A showing the rails of the track extending between wheels of the mover.

Referring also to FIG. 4, a plurality of ball bearings or roller bearings having an outer race with a substantially cylindrical hardened steel surface, as indicated by wheels 54, 56, 58, respectively, and associated components (e.g. flexible mounts 94) are mounted to the mechanical structure of the mover 18 and serve to interact with the one or more rails 44, 46 and 48, respectively, of the track 12. The wheels 54, 56, 58 are cylindrical wheels with a constant outer diameter. The wheels 54, 56, 58 may have an outer race with a crowned or barrel-shaped outer surface allowing the wheels to pivot while reducing the tangential contact length. The wheels 54, 56, 58 may have a generally similar hardness as the rails 44, 46, 48. The thickness of the wheels 54, 56, 58 generally corresponds with the height of the rails 44, 46, 48 so that a full width of the wheels 54, 56, 58 contact the rails 44, 46, 48.

A first set of four wheels 54a, 54b, 54c, 54d are mounted in a trapezoidal configuration to an inner surface 66 of the upper mounting arm 60 and correspond to rail 44 extending upwardly from the top edge 21 of the track 12. The four wheels 54 are mounted to the upper mounting arm 60 such that an axial axis 68 of the wheels 54 extends substantially perpendicular to the inner surface 66 of the upper mounting arm 60 and parallel to vertical axis 27. A first pair of lateral wheels 54a and 54b contacts a first sidewall 80 of the rail 44 and a second pair of lateral wheels 54c and 54d contacts a second sidewall 82 of the rail 44 opposite the first sidewall 82. The first pair of wheels 54a and 54b are closely spaced from the second pair of wheels 54c and 54d allowing the narrow rail 44 to fit therebetween and slide between the first pair 54a and 54b and second pair 54c and 54d, respectively. For example, the first pair of wheels 54a, 54b may be spaced approximately 1 inch from the second pair of wheels 54c, 54d which corresponds with a width of the rail 44. A radial axis 70 of the wheels 54 in the outward radial direction 29 contacts the rail 44 in a direction perpendicular to the sidewalls 80, 82 of the rail 44. The distance between the first pair of wheels 54a, 54b, respectively, and second pair of wheels 54c, 54d, respectively, is described below with respect to FIG. 5.

A second set of four wheels 56a, 56b, 56c, 56d are mounted in a similar rectangular formation to the inner surface 64 of the mounting platform 24 and correspond to rail 46 extending outwardly from the outer surface 20 of the track 12. The four wheels 56 are shown mounted to the mounting platform 24 at a location above the magnetic array 38; however, the wheels may also be located below the magnetic array 38 in a similar manner. The four wheels 56 are mounted to the mounting platform 24 so that an axial axis 76 of the wheels 56 extends substantially perpendicular to the inner surface 64 of the mounting platform 24 and parallel to outward radial direction 29. A first pair of lateral wheels 56a and 56b contacts a top wall 84 of the rail 46 and a second pair of lateral wheels 56c and 56d contacts a bottom wall 86 of the rail 46 opposite the top wall 84. The first pair of wheels 56a and 56b are closely spaced from the second pair of wheels 56c and 56d allowing the rail 46 to fit therebetween and slide between the first pair 56a and 56b and second pair 56c and 56d, respectively. For example, the first pair of wheels 56a, 56b may be spaced approximately 1 inch from the second pair of wheels 56a, 56b corresponding with a width of the rail 46. A radial axis 72 of the wheels 56 extending parallel to vertical axis 27 contacts the rail 46 in a direction perpendicular to the sidewalls 84, 86 of the rail 46. The distance between the first pair of wheels 56a, 56b, respectively, and second pair of wheels 56c, 56d, respectively, may be aligned such that the distance between the wheels 56a and 56b is substantially similar to the distance between the wheels 56c and 56d.

A third set of four wheels 58a, 58b, 58c, 58d are mounted in a trapezoidal formation to the inner surface 74 of the lower mounting arm 62 and correspond to rail 48 extending downward from the lower edge 25 of the track 12. The four wheels 58 are mounted to the lower mounting arm 62 such that an axial axis 92 of the wheels 58 extends substantially perpendicular to the inner surface 74 of the lower mounting arm 62 and parallel to the vertical axis 27. A first pair of lateral wheels 58a and 58b contacts a first sidewall 88 of the rail 48 and a second pair of wheels 58c and 58d contacts a second sidewall 90 of the rail 48 opposite the first sidewall 88. The first pair of wheels 58a and 58b are closely spaced from the second pair of wheels 58c and 58d allowing the rail 48 to fit therebetween and slide between the first pair 58a and 58b and second pair 58c and 58d, respectively. For example, the first pair of wheels 58a, 58b may be spaced approximately 1 inch from the second pair of wheels 58a, 58b corresponding with a width of the rail 48. A radial axis 78 of the wheels 58 extending parallel to the outward radial direction 29 contacts the rail 48 in a direction perpendicular to the sidewalls 88, 90 of the rail 48. The distance between the first pair of wheels 58a, 58b, respectively, and second pair of wheels 58c, 58d, respectively, is described below with respect to FIG. 5.

It is understood that although each set of wheels 54, 56, 58 provides four wheels, each set of wheels could also include two, three, or five or more wheels providing contact of the wheels on the rails 44, 46, 48 in a direction normal to the contact walls of the rails 44, 46, 48.

In a similar manner, it is understood that the number of rails could also include two or four or more rails providing support along both the vertical axis 27 and outward radial direction 29. For example, a first set of wheels may be mounted to the upper mounting arm 60 and a second set of wheels may be mounted to the mounting platform 24. Correspondingly, the first set of wheels may contact two parallel walls of a first rail and the second set of wheels may contact two parallel walls of the second rail.

The wheels 54, 56, 58 may be mounted to the mover 18 via flexible mounts 94 of the mounting surfaces on which they are attached to allow the wheels 54, 56, 58 to adapt to track 12 variations, for example, when the mover 18 is transitioning between straight track modules 14 and curved track modules 16 of the track 12 and must account for "transition gaps" increasing a clearance between the wheels 54, 56, 58 and rails 44, 46, 48 and "lifting" the wheels off from the rail. The flexible mounts 94 allow the wheels 54, 56, 58 to shift inward and outward along radial axis 70, 72, 78, respectively, while also allowing the wheels to retract or return to their original positions. For example, the flexible mounts 94 may provide an elastic material 98, such as a flexible metal spring or other elastomeric material that allows an axle 100 of the wheels 54, 56, 58 to shift perpendicular to the axial axis 68, 76, 92 of the wheels. The elastic material 98 may also be a coil spring, a Bellville spring, or other flexible component. The flexible mounts 94 maintain the wheels 54, 56, 58 substantially parallel to the mounting surface on which they are attached. The flexible mounts 94 may be used on any combination of the four wheels to provide the necessary compliance needed for changes due to inherent variations in the track 12, wear over time, and manufacturing tolerances. For example, all four wheels 54a, 54b, 54c, and 54d may include flexible mounts 94 or only adjacent wheels 54a and 54b may include flexible mounts 94 or only adjacent wheels 54c and 54d may include flexible mounts 94.

Figure 5:
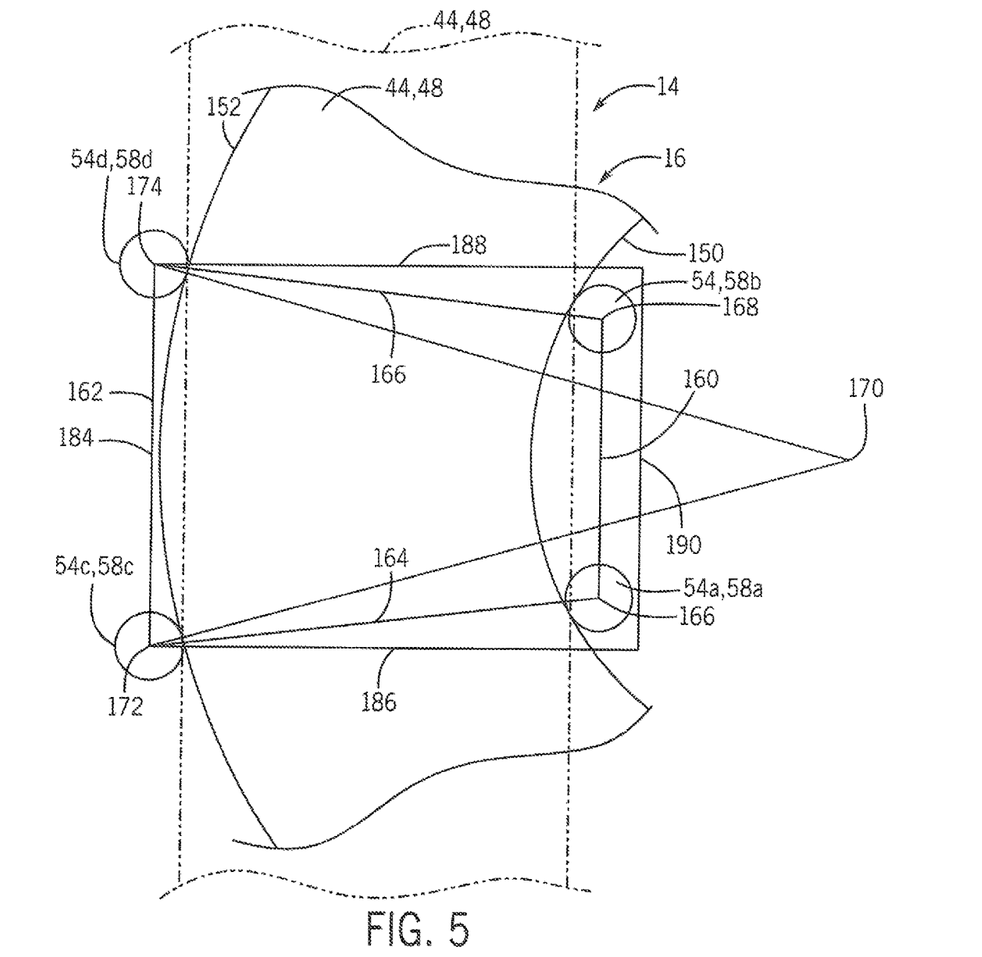
FIG. 5 is a representative diagram of the wheel positioning on the mover with respect to the straight and curved rails.

Referring to FIG. 5, the first set of four wheels 54a, 54b, 54c, 54d, and the third set of four wheels 58a, 58b, 58c, 58d are positioned with respect to rails 44, 48, respectively, to minimize a transition gap or jump that occurs when the mover 18 moves between the straight track modules 14 and curved track modules 16 given a fixed compliance of the wheel 54, 58 provided by the flexible mounts 94. The sets of wheels 54, 58 can maintain contact with the contact surface of the track when the mover is wholly on the straight track module 14, transitioning between straight 14 and curved 16 track modules, or wholly on the curved track module 16.

With respect to curved track 16, and referring to the first set of four wheels 54a, 54b, 54c, 54d, the inner wheels 54a, 54b will contact an inner circumference 150 of the curved rail 44 and outer wheels 54c, 54d will contact an outer circumference 152 of the curved rail 44. The center points 166, 168, 172, 174 of the wheels 54a, 54b, 54c, 54d, respectively, defined by the axes of rotation of the wheels form the corners of an isosceles trapezoid with the line segment joining the inner wheels 54a, 54b forming shorter base 160 parallel to the line segment joining outer wheels 54c, 54d forming the longer base 162, and the line segment joining wheels 54a, 54c forming a first leg 164 and the line segment joining wheels 54c, 54d forming a second leg 166 equal in length to the first leg 164.

The inner wheels 54a, 54b are positioned outside of a triangle having three vertices formed by a center of curvature 170 of the curved track 16 and the two center points 172, 174 of the outer wheels 54c, 54d, respectively. The inner wheels 54a. 54b are also positioned inside a rectangle having straights sides formed by joining the center points 172, 174 of the outer wheels 54c, 54d to form a first side 184 of the rectangle, second and third sides 186, 188 extending from the center points 172, 174, respectively, toward and inward of the inner circumference 154, and enclosed by a fourth side 190 tangent to the inner wheels 54a, 54b.

Similarly, the third set of four wheels 58a, 58b, 58c, 58d, inner wheels 58a, 58b are positioned along an inner circumference 150 of the curved rail 44 and outer wheels 58c, 58d are positioned along an outer circumference 152 of the curved rail 44. The center points 166, 168, 172, 174 of the wheels 58a, 58b, 58c, 58d, respectively, defined by the axes of rotation of the wheels form the corners of an isosceles trapezoid with the line segment joining the inner wheels 58a, 58b forming shorter base 160 parallel to the line segment joining outer wheels 58c, 58d forming the longer base 162, and the line segment joining wheels 58a, 58c forming a first leg 164 and the line segment joining wheels 58c, 58d forming a second leg 166 equal in length to the first leg 164.

The present inventors have determined that this positioning of the wheels 54 and 58 with different separations between the wheels on the inside of the tracks 13 and 16 than on the outside of the tracks 14 and 16 reduces the necessary compliance caused by changing separation between the corresponding wheels on the inside and outside of the track thus reducing a nearly imperceptible tendency of the wheels to leave the track on transitions between curved and straight track for a given compliance restoring force. The result is reduced track and bearing wear for a desired level of mechanical rigidity.

Referring to FIG. 4, the wheels 54, 56, 58 and rails 44, 46, 48 allow the mover 18 to remain securely attached to the track modules 14, 16 while allowing relatively free movement of the movers 18 along the track modules and supporting mechanical loads and forces encountered during motion. The wheels 54, 56, 58 are oriented such that loads are carried along their radial axes perpendicular to their axial axes. In this respect, the natural strength of the wheels 54, 56, 58 along the radial directions are utilized. For example, loads placed upon the mover 18 and creating a downward force along vertical axis 27 is carried by wheels 56. The downward forces are placed along the radial axis 72 of wheels 56. Centrifugal forces and torsion placed upon the mover 18 and creating an outward force along the outward radial direction 29 is carried by wheels 54 and 58. The outward radial force is placed along the radial axis 70 and 78 of wheels 54 and 58, respectively. Very little force is placed on the wheels 54, 56, 58 along their axial axis 68, 76, 92, respectively, where the wheels are weakest.

The wheels 54, 56 of the upper mounting arm 60 and lower mounting arm 60, respectively, are positioned such that the mounting platform 24 is spaced from track 46 and so the rectangular block 104 of the magnetic array 38 is spaced from the inner surface 20 of the vertically extending wall 13 on the inner end and such that the sensor component 42 is spaced from the inner surface of the vertically extending wall 13 on the outer end. In a similar manner, the wheels 56a, 56b, 56c, 56d of the mounting platform 24 are positioned such that the upper mounting arm 60 and lower mounting arm 60 are spaced from the tracks 44, 48.

While a horizontal configuration is illustrated in FIG. 1A, other orientations may also be provided, such as ones in which the illustrated oval is generally stood on a side or end, or at any angle between. It should be noted that other configurations are equally possible. The configurations may form closed loops of various shapes, but may also comprise open-ended segments.

Figure 1B:
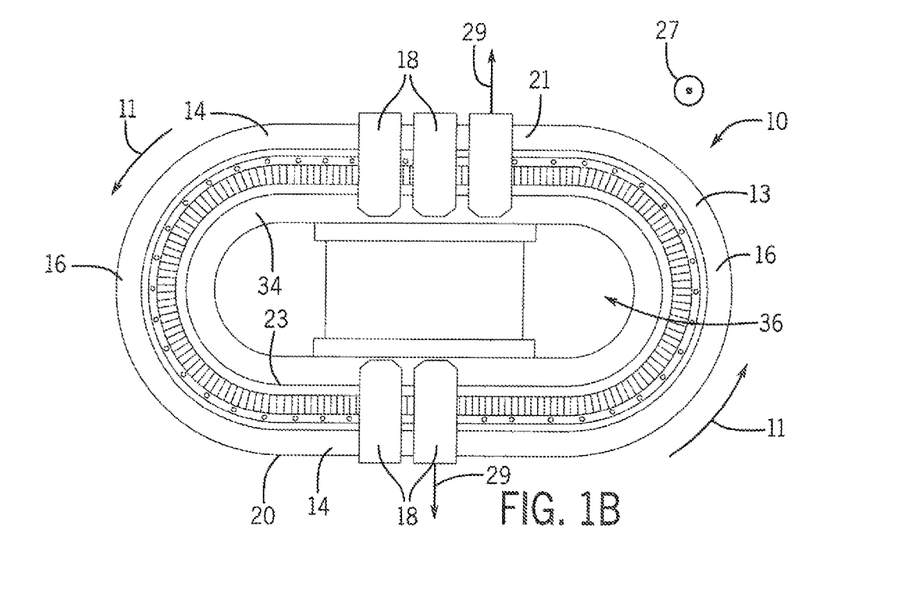
FIG. 1B is a top view of a similar transport system in which motor coils are positioned differently than in the system of FIG. 1A.

FIG. 1B illustrates an alternative configuration for a similar transport system. However, in this configuration, rather than motor coils 50 being positioned around the periphery of the outer surface 20 of the system, coils 50 are positioned around the top edge 21 of the system, in a generally planar arrangement. Magnet assemblies of each mover 18 face these coils 50 and are spaced from the coils 50 by a small air gap. It is understood that the illustrated embodiment may be adapted for use with the alternative configuration by rotating the mounting platform 24 to extend parallel to a top of the edge 21 of the system, and the mounting arms 60, 62 extending parallel along an outer 20 and inner 23 surface of the track wall 13.

As will be appreciated by those skilled in the art, in many applications, the transport system 10 will be configured to inter-operate with other machines, robots, conveyers, control equipment, and so forth (not shown) in an overall automation, packaging, material handling or other application. The transport system 10 may be a linear motor system as described in US Application Publication No. 2014/0331888, entitled "Controlled Motion System Having an Improved Track Configuration," the entire disclosure of which is hereby incorporated by reference.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference, which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. When elements are indicated to be electrically connected, that connection may be direct or through an intervening conductive element.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

The invention claimed is:

1. A mover for use on a track providing a closed loop extending along a track circumferential path and having at least two rails extending along the circumferential path and displaced from each other in a direction perpendicular to the circumferential path, the mover comprising:
   a frame supporting a magnetic element on an inner surface and producing an attractive force in a direction toward corresponding magnetic elements on the track and supporting a first, a second, and a third set of bearings;
   wherein each set of bearings provides two wheels each having peripheral contact surfaces opposed across a gap distance, each wheel having a wheel centerline defined by an axis of rotation of each wheel, and each set of bearings having a midpoint defined between two wheel centerlines of the set of bearings;
   wherein the axes of the first bearing set and third bearing set are substantially perpendicular to the axes of the second bearing set and substantially perpendicular to the direction of the attractive force of the magnetic element;
   wherein the gap distance between any two wheels of the same bearing set is less than a distance between the midpoints of any two bearing sets;
   wherein a distance between the midpoints of the first and third bearing sets is greater than a gap distance of the two wheels of the second bearing set; and
   wherein the second bearing set is positioned on the inner surface of the frame displaced from the magnetic element of the frame.

2. The mover of claim 1 wherein each of the wheels is rotatable about a respective axis and the axes for the two wheels of each bearing set are parallel and the contact surfaces are opposed across the gap distance.

3. The mover of claim 1 wherein at least one of the two wheels of the first and second set includes a compliant member adapted for expansion of the gap distance.

4. The mover of claim 3 wherein the compliant member is a spring.

5. The mover of claim 1 wherein the wheels have an outer cylindrical periphery providing a hardened steel surface.

6. The mover of claim 1 wherein the wheels have an outer barrel shaped periphery providing a hardened steel surface.

7. The mover of claim 1 wherein each set of bearings provides four wheels each having peripheral contact surfaces rotatable about a wheel centerline defined by an axis of rotation of each wheel and the axes for the four wheels are parallel and the contact surfaces for two of the wheels are in opposition across a gap distance and the wheel centerlines for any two of the wheels is bisected by a midpoint.

8. The mover of claim 7 wherein the four wheels form an isosceles trapezoid wherein inner wheels contacting an inner circumference of the rail of the track form a shorter base of the trapezoid and outer wheels contacting an outer circumference of the rail of the track form a longer base of the trapezoid parallel to the shorter base.

9. The mover of claim 8 wherein the inner wheels are formed outside of a triangle formed by joining a center of curvature of the track and the axes of rotation of the two outer wheels along their radii of curvature and a segment joining the axes of the two outer wheels.

10. The mover of claim 1 wherein the midpoints of any two sets of bearings are displaced by a distance substantially less than a height of the frame.

11. The mover of claim 1 wherein the track further comprises a mover support frame supporting a magnetic element for interacting with the magnetic elements on the mover and supporting a first and a second rail extending along the circumferential path and displaced from each other in a direction perpendicular to the track circumferential path; wherein the track provides two opposed parallel contact surfaces; and wherein the first and second rail are displaced from each other a distance less than a length of the mover support frame.

12. The mover of claim 1 wherein the gap distance between wheels of the first, second and third bearings sets is substantially equal.

13. A track used with a mover traveling along the track along a track circumferential path and having at least a first, a second, and a third set of bearings having peripheral contact surfaces rotatable about axes and the axes for two wheels of each first, second, and third set of bearings are parallel and the axes of the first bearing set and third bearing set are substantially perpendicular to the axes of the second bearing set, wherein each set of bearings provides two wheels each having peripheral contact surfaces opposed across a gap distance, each wheel having a wheel centerline defined by an axis of rotation of each wheel, and each set of bearings having a midpoint defined between two wheel centerlines of the set of bearings, wherein the gap distance between any two wheels of the same bearing a set is less than a distance between the midpoints of any two bearing sets, and wherein a distance between the midpoints of the first and third bearing sets is greater than a gap distance the two wheels of the second bearing set, the track comprising:
   a mover support frame supporting a magnetic element for interacting with corresponding magnetic elements on the mover and producing an attractive force in a direction toward the magnetic element of the frame and supporting a first rail, a second, and a third rail extending along the circumferential path, the first and second rail displaced from each other in a direction perpendicular to the track circumferential path and the second and third rail displaced from each other in a direction perpendicular to the track circumferential path;
   wherein the track provides two opposed parallel contact surfaces;
   wherein the first and second rail are displaced from each other a distance less than a length of the mover support frame;
   wherein the axes of the first bearing set and third bearing set of the mover are positioned substantially perpendicular to the direction of the attractive force of the magnetic elements; and
   wherein the second bearings set is displaced from the magnetic element on the mover.

14. The track of claim 13 wherein the first and second rails are independently separable from the mover support frame and have a rectangular cross section.

15. The track of claim 13 wherein the mover support frame further supports a third rail extending along the circumferential path and displaced from the first and second rails in a direction perpendicular to the track circumferential path.

16. The track of claim 13 wherein the mover support frame provides a first lateral face, a second lateral face parallel to the first lateral face, and a third transverse face extending between the first and second lateral faces, and defining a track attachment surface wherein the first rail is mounted to the first lateral face, the second rail is mounted to the third transverse face, and a third rail is mounted to the second lateral face.

17. The track of claim 13 wherein a width of the first and second rail is at least 10 times less than a length of the mover support frame.

18. The track of claim 13 wherein the opposed parallel contact surfaces of the first, second, and third rails are perpendicular to the first lateral face, second lateral face, and third transverse face, respectively.

19. The track of claim 13 wherein the rails are hardened steel.

20. A method of transporting a mover on a track along a transport direction comprising:
providing a track support frame providing a first face, a second face, and a third face defining a track attachment surface holding a plurality of individually controlled electromagnetic coils effective for creating electromagnetic fields, the track attachment surface carrying a first rail, a second rail, and a third rail each having opposed parallel surfaces extending along the transport direction, the mover providing a first lateral arm communicating with the first face, a second lateral arm communicating with the second face, and a mounting platform extending between the first lateral arm and second lateral arm and holding magnetic elements on an inner surface and producing an attractive force in a direction toward the electromagnetic fields of the track support frame, the mover carrying a first, a second, and a third set of wheels contacting the opposed parallel surfaces of the first, second, and third rails, respectively, in a direction perpendicular to the transport direction and in a direction perpendicular to an axis of rotation of the wheels, and the first and second rails separated on different perpendicular faces of the track support frame and the second and third rails separated on different perpendicular faces of the track support frame and substantially perpendicular to the direction of the attractive force of the magnetic element, wherein each set of bearings provides two wheels each having peripheral contact surfaces opposed across a substantially equal gap distance, each wheel having a wheel centerline defined by an axis of rotation of each wheel, and each set of bearings having a midpoint defined between two wheel centerlines of the set of bearings, wherein the gap distance between any two wheels of the same bearing set is less than a distance between the midpoints of any two bearings sets, wherein a distance between the midpoints of the first and third bearing sets is greater than a gap distance the two wheels of the second bearing set, and wherein the second bearing set is positioned on the inner surface of the frame displaced from the magnetic elements of the mounting platform:
mounting the mover to the track assembly;
transporting the mover along the track assembly along the transport direction; and
restraining movement of the mover in a normal direction perpendicular to a direction of motion of the mover along the track assembly and a vertical direction perpendicular to the transport direction and perpendicular to the normal direction.

* * * * *